(12) United States Patent
Portman et al.

(10) Patent No.: US 8,094,787 B2
(45) Date of Patent: Jan. 10, 2012

(54) METHOD AND SYSTEM FOR UTILIZING INFORMATION FOR EFFICIENT RECORDING SOLUTIONS IN A COMPLEX MULTI-MEDIA RECORDING ENVIRONMENT

(75) Inventors: Leon Portman, Rishon Lezion (IL); Shay Shem Tov Levy, Hod Hasharon (IL); Shay Weiss, Ra'anana (IL)

(73) Assignee: Nice Systems Ltd., Raanana (IL)

( * ) Notice: Subject to any disclaimer, the term of this patent is extended or adjusted under 35 U.S.C. 154(b) by 1041 days.

(21) Appl. No.: 11/968,683

(22) Filed: Jan. 3, 2008

(65) Prior Publication Data

US 2009/0175423 A1 Jul. 9, 2009

(51) Int. Cl.
*H04M 1/64* (2006.01)
(52) U.S. Cl. ........ 379/68; 379/88.22; 370/241; 370/352
(58) Field of Classification Search .............. 379/68–87, 379/88.19–88.21, 88.22–28; 370/241, 352
See application file for complete search history.

(56) References Cited

U.S. PATENT DOCUMENTS

| | | | |
|---|---|---|---|
| 6,246,752 B1* | 6/2001 | Bscheider et al. | 379/88.22 |
| 2008/0056241 A1* | 3/2008 | Haddad et al. | 370/352 |
| 2008/0298253 A1* | 12/2008 | Walker et al. | 370/241 |

* cited by examiner

*Primary Examiner* — Fan Tsang
*Assistant Examiner* — Van D Huynh
(74) *Attorney, Agent, or Firm* — Pearl Cohen Zedek Latzer, LLP

(57) ABSTRACT

System and method for recording telephone calls comprising receiving computer telephony integration fields from first and second sources, identifying which of the CTI fields are physical CTI fields to be used for locating audio to be recorded, identifying which of the CTI fields are logical CTI fields, identifying one of the physical CTI fields received from the first source and one of the logical CTI fields received from the second source as being related to a specific telephone call and recording said telephone call based on audio location information from the physical CTI field associated with the call.

12 Claims, 3 Drawing Sheets

METHOD AND SYSTEM FOR UTILIZING INFORMATION FOR EFFICIENT RECORDING SOLUTIONS IN A COMPLEX MULTI-MEDIA RECORDING ENVIRONMENT

BACKGROUND

Capturing and recording interaction-related sessions, such as telephone calls, is a well known practice within commercial and public environments, for example contact centers, emergency services and financial institutions. As the volumes of telephone sessions grow, call centers and other recording environments become more complex.

The complexity of a call center may create situations in which information, such as computer telephony integration (CTI) information, related to a specific telephone call may arrive to a recording system from more than one reporting system or source. Such situations may lead to inefficient use of recordings resources as the same telephone call may be recorded from different sources at different servers. For example, at call centers having a predictive dialer system, at least two entities, the switch and the predictive dialer, are capable of reporting CTI information. The information may refer to the same session and physical extensions. Currently, even if the information received is related to the same session, the recording system may treat the information as two separate sessions arriving from two independent systems. Accordingly, a system and a method for utilizing information for efficient controlling of recordings in a call center are highly required.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
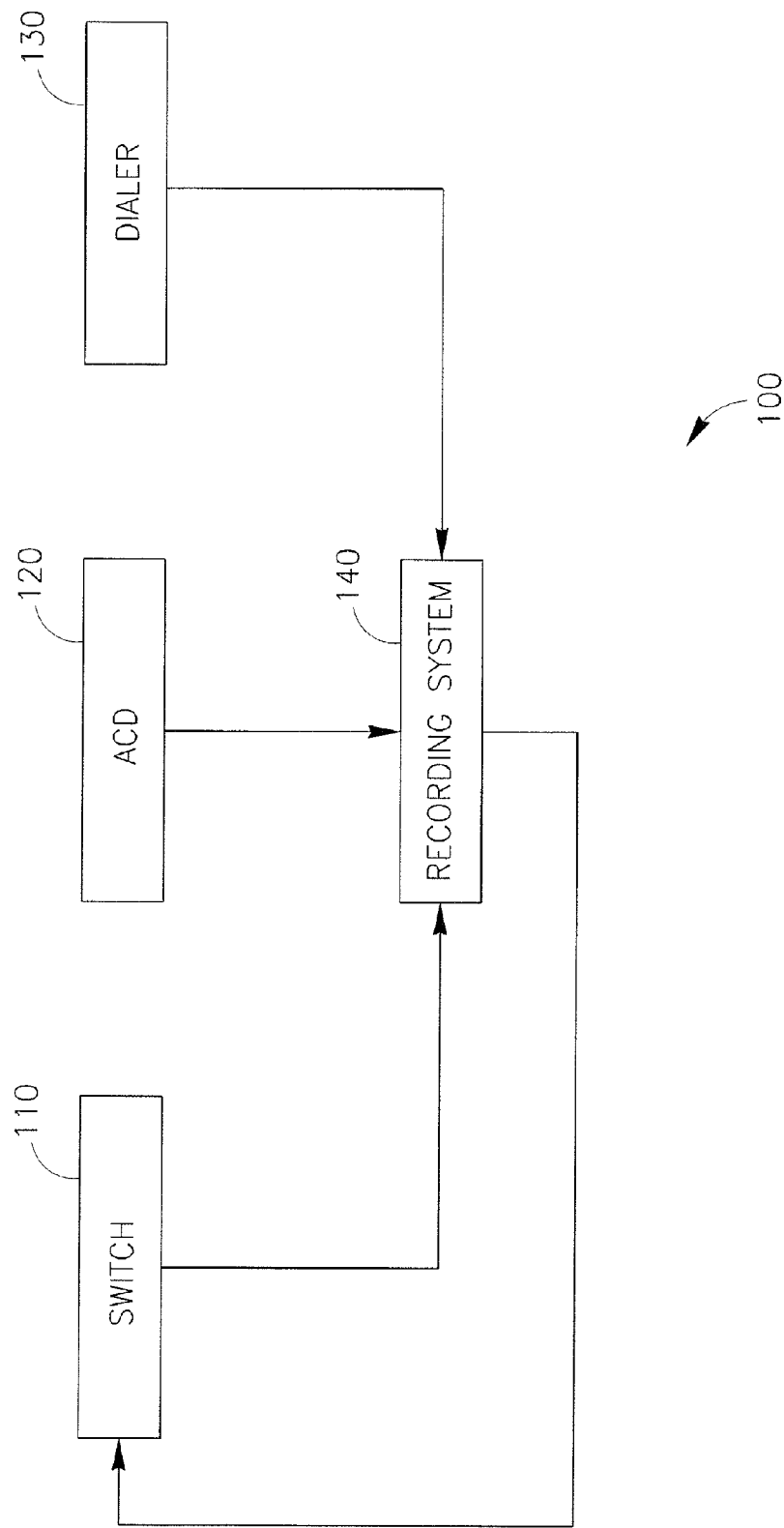
FIG. 1 is a high-level block diagram of an exemplary telecommunication recording environment according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Although embodiments of the invention are not limited in this regard, the terms "contact center" and "call center" as used herein may be used throughout the specification and claims to describe any centralized or distributed locations used for collective handling of multi-media information, for example, telephone calls, faxes, e-mails and the like, or any other centralized or distributed locations used for the purpose of receiving, transmitting and controlling a large volume of interaction-related sessions.

Although embodiments of the invention are not limited in this regard, the terms "call", "session" or "interaction" as used herein may be used throughout the specification and claims to describe a communication session between two or more telecommunication components such as, a telephone call, an instant messaging session, chat, video conference or any other multi-media session or interaction in a multi-media communication environment. The terms "call", "session", "communication session" or "interaction" may refer to any audio data, video data, screen capture data or any other media or multi-media session.

Reference is now made to FIG. 1, which is a high-level block diagram of an exemplary telecommunication recording environment according to embodiments of the present invention. A telecommunication recording environment 100, such as a call center or a contact center may include a plurality of systems and devices which may control handle and utilize calls or telecommunication sessions handled by telecommunication environment 100. For example, environment 100 may include a packet telephony switch 110 such as, for example, Private Branch Exchange (PBX), Internet Protocol (IP) PBX, gateway and the like. Environment 100 may include additional systems or devices such as, Automatic Call Distributor (ACD) system 120 and a predictive dialer 130. It should be understood to a person skilled in the art that may include other units capable of communicating and transferring information.

Telecommunication environment 100 may further include a recording system 140 which may record incoming and/or outgoing calls to/from environment 100 based on information, such as Computer telephony integration (CTI) information, received from switch 110, ACD 120 and Dialer 130, as described in detail below. Although in the exemplary illustration of FIG. 1, one system switch, one ACD, one predictive dialer and one recording system are shown, it should be understood to a person skilled in art that the invention is not limited in this respect and according to embodiments of the present invention, telecommunication recording environment 100 may include any suitable numbers of switches, computerized systems and recording systems or any other type of system, device or communication equipment.

According to some embodiments of the invention, recording environment 100 may be capable of performing active recordings of telephone calls, for example, voice over IP (VOIP) telephone calls. The term "active recording" refers to a situation in which switch 110 may be aware of the recording process. For example, in active VoIP recording, recording system 140 may interact directly with switch 110 to trigger forwarding of VoIP packets directly to the recording device. The actual packets may be sent from the switch itself or may be forward from a VoIP telephone device, depending on the specific manufacturer's implementation. An active recording approach may be implemented in a single-site environment or a distributed multi-site environment. It should be understood to a person skilled in the art that recording environment 100 may additionally and/or alternatively perform passive recording using for example a sniffing unit (not shown).

Recording system 140 may receive physical and logical CTI information, which may be implemented as CTI data fields, regarding a specific call from more than one source, for example from switch 110 and from one of ACD 120 and dialer 130. In some embodiments of the invention, recording system 140 may receive physical CTI information and logical CTI information regarding a specific call from switch 110 and may receive only logical CTI information regarding the specific call from ACD 120 or Dialer 130. Recording system 140 may correlate between information received from different sources in relation to the specific call and may utilize the information in order to decide whether to record the call and which resources to use for the recording.

The terms "physical information", "physical CTI information", "physical CTI data fields" or "media source datum" as used herein may refer to any information identifying a media, such as a call or a session, for recording purposes, e.g., the information which identifies for a recording system where and or how to physically record the call. Such information should be provided to the recording system on a per-call basis to enable the recording of the session. For example, a physical CTI data field may be used by recording system 140 to record a specific telephone call. Non-limiting examples of types of media source data, physical CTI information or data fields may include an extension number of a telephone extension participating in a call, an IP address of a telephone device (used, for example, for passive sniffing), a Media Access Control (MAC) address of a telephone device, a Time-Division Multiplexing (TDM) trunk information of a call, a CTI call identifier of a call (used, for example, for active recording), dedicated CTI fields, and the like. Any other information or CTI information which may identify a specific media for recording may be used.

The terms "logical information", "logical CTI information" or "logical CTI data fields" as used herein may refer to any non-physical information related to the session. Such logical information may include CTI information of a call, for example, caller's number (ANI), number dialed (DNIS), telephone control information, agent state control and the like. It should be noted that the term logical CTI information as used herein may include any information regarding the call that is used for call tracking purposes and not used for physically identifying where to record the call.

According to some embodiments of the invention, recording environment 100 may be a complex environment, e.g., it may include a plurality of network switches or computer networking systems, e.g., switch 110, which may transfer physical and/or logical information to recording system 140 and a plurality of systems, ACD 120 and predictive dialer 130 which may transfer physical and/or logical information to recording system 140. Recording system 140 may receive logical and physical information related to the same telephone call from both switch 110 and dialer 130 (or ACD 120).

Recording system 140 may correlate and/or integrate the logical information, e.g., logical CTI information, received for example, from dialer 130 and switch 110 and the physical information. e.g., physical CTI information, received from switch 110, may identify, based on the integrated information, which call is to be recorded and which media source is to be used for recording the call. Recording system 140 may instruct switch 110 to record the call, e.g., to perform active VoIP recording of the call. It should be noted to a person skilled in the art the CTI information may be transferred directly from the switch or from a separate CTI server coupled to the switch.

Figure 2:
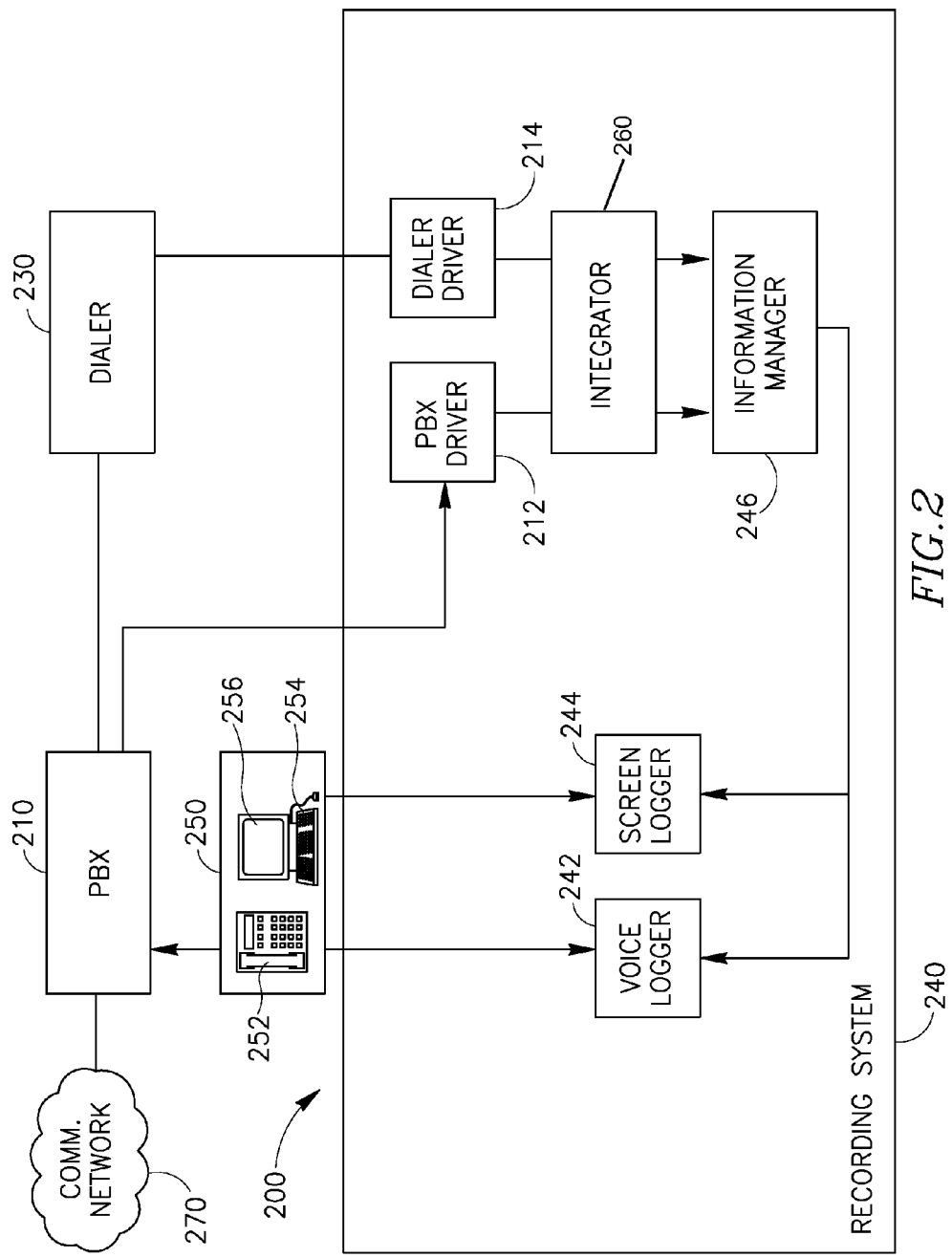
FIG. 2 is a high-level block diagram of an exemplary telecommunication recording environment according to embodiments of the present invention.

Reference is now made to FIG. 2, which is a high-level block diagram of an exemplary telecommunication recording environment according to embodiments of the present invention. According to embodiments of the invention, telecommunication recording environment 200 may be, for example, an implementation of recording environment 100 of FIG. 1.

According to embodiments of the invention, telecommunication recording environment 200 may include a packet telephony switch 210, e.g. PBX, a predictive dialer 230, a recording system 240 and one or more user workstations 250 which may include, for example, a telephone 252, a computer 254 and a screen 256. Recording environment 200 may be connected to one or more communication networks 270 such as, for example, the Internet network and/or a public switched telephone network (PSTN) and may receive and transmit data such as telephone calls, from/to those networks.

Incoming calls or media sessions may be routed through switch 210 via ACD (not shown) to user workstations 250 and outgoing calls, for example, from workstations 250 initiated by predictive dialer 230 may be routed through switch 210 to external networks 270. Recording system 240 may record some or all of the incoming and/or outgoing calls as described in detail below with reference to embodiments of the present invention.

Recording system 240 may include a voice logger 242 to record audio data, such as telephone calls associated with telephone 252, a screen logger 244 to record screen data associated with screen 256 and an information manager 246 to control recording of selective sessions.

According to some embodiments of the invention, a complex recording environment, such as recording environment 200, may include a plurality of systems or entities capable of reporting CTI information, for example, switch 210 and dialer 230. Therefore, recording system 240 may include one or more drivers, e.g., a dedicated driver for each system or component of recording environment 200, for example, a CTI switch driver 212 coupled to switch 210 and a CTI dialer driver 214 coupled to dialer 230. Driver 212 may include a physical layer through which it may receive from switch 210 basic physical information via a physical layer communication protocol. Driver 214 may include a physical layer through which it may receive from dialer 230 basic physical information via a physical layer communication protocol.

In addition each driver may receive, via for example, a logical layer, CTI data or information which includes the physical CTI data and logical CTI data. For each CTI driver, a configuration determination or decision may be made identifying which CTI data fields are considered to be physical CTI data fields and which are considered to be logical CTI data fields. The physical CTI data fields may be used for locating audio data to be recorded by recording system 240 and the logical CTI fields may be used for other purposes such as telephone call tracking, monitoring and management of the recording system, triggering analytics, real-time monitoring and other applications either in real-time or offline. The decisions regarding which CTI data fields are considered physical and which are considered logical may be performed statically at the set-up time of recording environment 200 or dynamically during run-time of recording environment 200. In addition the configuration decision process may include identifying which fields may be considered as identical fields, e.g., recording environment 200 may treat such fields as the same.

Although the scope of the present invention is not limited in this respect, recording system 240 may include an integrator 260 coupled to drivers 212 and 214, e.g., as the logical layer. Although the scope of the present invention is not limited in this respect, the logical layer may be shared between a plurality of drivers such that recording system 240 may have a single logical layer to receive in real time logical CTI data fields from more than one component of recording environment 200 so as to enable efficient use of the recording resources, intelligent active recording of calls initiated, for example, by dialer 230 using resources of switch 210 and advanced call flow analysis capabilities of calls initiated, for example, by the predictive dialing system (dialer 230).

Integrator 260 may receive CTI data associated with a telephone call or a communication session from both CTI switch driver 212 and CTI dialer driver 214, may separate between physical CTI information and logical CTI information and may identify which of the CTI data fields are physical CTI fields usable for locating audio to be recorded and allocating recording resources and which of the CTI data fields are logical CTI data fields. Integrator 260 may transfer the physical and logical data fields to information manager 246.

Integrator 260 may identify at least one of the physical CTI data fields received from switch driver 212 and at least one of the logical CTI fields received from dialer driver 214 as being related to a specific telephone call. Integrator 260 may correlate between physical CTI data fields and logical CTI data fields related to the same telephone call and may transfer all the information to information manager 246.

According to embodiments of the invention, both the physical and logical information, implemented as physical and logical CTI data fields may be provided to information manager 246. Information manager 246 may determine based on the received logical CTI data fields whether a telephone call is to be recorded and may instruct voice logger 242 and/or screen logger 244 to record audio data of the telephone call from a specific media source according to the physical CTI data fields. Information manager 246 may utilize the integrated information for allocation of recording resources and control of the recording process based on the audio location information from the physical CTI data fields and may use the logical CTI data fields for telephone call flow tracking and for analytics purposes.

According to some embodiments of the invention, integrator 260 may receive from switch driver 212 and dialer driver 214 a plurality of CTI data fields related to the same telephone call of which some CTI data fields from the different sources may be identical, some CTI data fields may be provided only by switch driver 212 and some CTI data fields may be provided only by dialer driver 214. Some CTI fields from different sources related to a specific telephone call may refer to the same actual information. They, however, be presented in a different format or value by each of the drivers. Integrator 260 may identify, integrate and correlate CTI data fields from different sources related to a specific telephone call in order to generate an inclusive identification of the specific telephone call to prevent redundant recordings of the same call. The physical information may include CTI data fields such as, for example, switch identification (ID) field, Dialed Number (DN) field and Unique ID (UID) and the logical information may include, for example, call ID field, agent ID field and the like. Any other field, detail or information regarding the telephone call may be used.

Although the present invention is not limited in this respect, one or more fields of the CTI information regarding a certain telephone call reported through switch driver 212 may be identical to one or more fields of the information regarding the same telephone call reported through dialer driver 214. One or more fields of the information regarding a certain telephone call reported through switch driver 212 may be different from one or more fields of the information regarding the same telephone call reported through dialer driver 214. Integrator 260 may identify the identical fields, identify the two reported sessions as a single session, based on the identical fields, and generate a full identification of the specific telephone call by integrating all the details of both reported sessions in order to allow recording system 240 an efficient recordings management.

Below is exemplary information associated with a specific telephone call, given, by way of illustration only, to show certain aspects of embodiments of the present invention without limiting its scope. For example, a user of the system or an agent may log-in into telephone 252 of workstation 250. The agent may receive a certain agent ID, for example "1", which may be used for identifying the agent on switch 210, the agent may further receive a DN, for example "111", which may identify the extension number and a UID which identify the telephone device which is being used by the agent.

Predictive dialer 230 may initiate an outgoing call, when a connection is made through switch 210 to the agent identified by the switch as "1". Dialer 230, however, may identify the agent by a different agent ID, for example, by agent ID "abc".

Recording system 240 may receive different information or CTI data fields regarding the same telephone call or session from dialer 230 and switch 210. For example, the information regarding the session transferred from predictive dialer 230 to recording system 240 may include agent ID="abc" and DN=111 while the information regarding the same session transferred from switch 210 to recording system 240 may include agent ID="1" and DN=111.

Integrator 260 may receive two different sets of details regarding the same session through switch driver 212 and dialer driver 214. For example, through a physical layer of switch driver 212, integrator 260 may receive the following CTI data fields:
switch ID=1,
DN=111,
agent ID=1,
UID=222
Call ID=1234.

Through a physical layer of dialer driver 214, integrator 260 may receive the following CTI data fields:
switch ID=2,
DN=111,
Agent ID=abc,
Call ID=4321.

Integrator 260 may receive the entire CTI information and media source information from both switch driver 212 and dialer driver 214, may identify the CTI data fields, integrate and correlate the information in order to generate a single identification of media source information regarding the call to allow efficient utilization of recording resources, e.g., to prevent redundant recordings of the same session. Integrator 260 may identify that a certain field is identical in both the set of data fields received from switch driver 212 and the set of data fields received from dialer driver 214, for example, the data field related to the DN having a value of 111 at both sets, and may determine that the information from both sources relate to the same telephone call.

Accordingly, for example, the media source information for recording of the telephone call generated based on the CTI information received by PBX driver 212 and Dialer driver 214 may include the values of Switch ID=1,
DN=111,
agent ID=1,
Call ID=1234.

Although the present invention is not limited in this respect, such a determination or identification may be based on previous knowledge of the topology of recording environment 200, e.g., the number of switches, the connection between systems in environment 200 and the like. For example, if recording environment 200 having a single switch, recording system 240 may be pre-configured to identify any switch ID as the switch ID of the single switch configured in recording environment 200.

In some embodiments of the invention recording system 240 may not include integrator 260 and the integration and identification process may be performed based on the knowledge of a specific configuration of recording environment 200.

Integrator 260 may identify, correlate and integrate the CTI data fields based on, for example, the topology of the telephony entities in the system, and based on common information from the various sources. According to system topology, integrator 260 may generate a full identification of a session or a call, based on the integrated information from dialer 230 and switch 210. Integrator may interface all CTI sources of the system, may separate logical information from physical information and may generate a complete picture of each session.

The physical CTI data fields may be provided to information manager 246 to be used for intelligent recording resources utilization. The logical CTI data fields may be provided to information manager 246 for call information tracking purposes. For example, information manager 246 may use the logical CTI data fields for call information tracking application which may enable recording system 240 to follow the call throughout recording environment 200 and to put together different segments of the same call. The term "call information tracking" refers to information about the flow of a call and events related to the call, such as transferring the call to another agent, putting a call on hold status for a period of time, and the like. Although a session was transferred between agents and/or was on hold for a few minutes, the entire session may be recorded as a single, complete session.

According to some embodiments of the invention, integrator 260 may implement information sharing between the various CTI systems in such a way that the required CTI fields for recording, which may be available only via one of the systems, e.g, call ID from switch 210 may be utilized by other systems, e.g., by predictive dialer 230, thus enabling intelligent active recording of predictive dialer 230 calls via switch 210 resources.

Embodiments of the invention may further enable advanced analysis of the flow of a certain call. The correlation or integration of information performed by integrator 260 may allow handling situation in which for some of the recording methods, e.g. which may be operated at lower levels of switch 210, some dedicated CTI information may be required, but this type of information may not be available via, for example, the CTI information reported by predictive dialer 230.

For example, when there are a plurality of CTI sources, e.g., when agent puts a call on hold which is reported via switch 210, recording system 240 may be able to analyze this event as if it was reported by dialer 230 and may correlate the "hold" event to the session reported by dialer 230 (although such reporting may arrive through switch 210 and not through dialer 230). As another example, dialer 230 may not be able to report information regarding the time before the session was initiated, such as the time from directing a call to an agent and the initiation of the session. Integrator 260 may use information received from switch 210 to complete details regarding the call.

Although in the exemplary illustration of FIG. 2, switch driver 212 and dialer driver 214 are shown as elements of recording system 240, it should be understood to a person skilled in the art that the invention is not limited in this respect and according to embodiments of the present invention the switch driver 212, dialer driver 214 or any other driver coupled to a CTI system may be implemented as stand alone units, as an integrated unit or may be implemented inside switch 210 and dialer 230 respectively.

Although in the exemplary illustration of FIG. 2 information manager 246, integrator 260, switch driver 212 and dialer driver are separate blocks, it should be understood to a person skilled in art that the invention is not limited in this respect and according to embodiments of the present invention the functions of information manager 246 and integrator 260, switch driver 212 and dialer driver 214 may be implemented at the same block. Any other block implementation may be used.

Embodiments of the present invention may provide an intelligent solution which may enable a recording system, e.g., system 200 to integrate with as much CTI systems as needed in parallel, viewing the different calls from the different CTI sources separately, while enabling efficient utilization of recording resources along with providing the necessary CTI information for recording calls from different CTI sources.

Information manager 246 may be implemented by a server which may collect the CTI information received from switch driver 212 and dialer driver 214 and may store it in a dedicated storage (not shown). Although the scope of the present invention is not limited in this respect, types of storage or memory that may be used with embodiments of the present invention may include, for example, a hard disk, a Flash memory, a random access memory (RAM), dynamic RAM (DRAM), static RAM (SRAM) and the like.

Although in the exemplary illustration of FIG. 2, a plurality of elements, devices or component of telephony-recording environment 200 are shown, it should be understood to a person skilled in the art that the invention is not limited in this respect and according to embodiments of the present invention telephony recording environment 200 may be any contact center, call center or any other communication environment which may include any suitable elements or numbers of elements or components that may transfer CTI information according to embodiments of the present invention.

Figure 3:
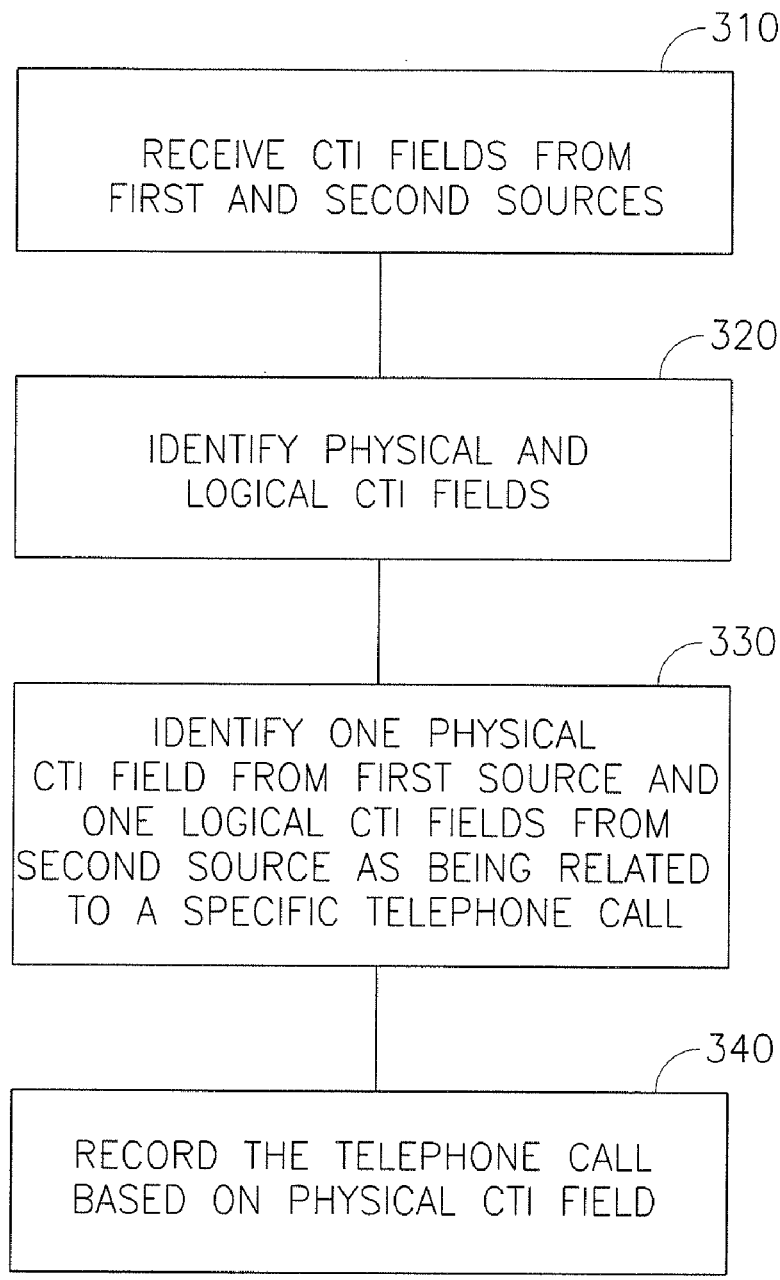
FIG. 3 is a flowchart of a method for utilizing information for efficient recording solutions in a complex recording environment according to embodiments of the present invention.

Reference is now made to FIG. 3, which is a flowchart of a method for utilizing information for efficient recording solutions in a complex recording environment according to embodiments of the present invention. Operations of the method may be implemented, for example, by system 100 of FIG. 1, by system 200 of FIG. 2, and/or by other suitable units, devices, and/or systems.

As indicated at box 310, the method may include receiving a telephone call information including CTI data fields from a plurality of systems or sources of a telecommunication environment, for example, switch 210 and predictive dialer 230 of system 200 (of FIG. 2). The CTI data fields may be received from at least first and second sources. The CTI information received may include physical CTI data fields referring to a media source of a call and logical CTI data fields referring to non-physical details related to the call.

As indicated at box 320, the method may include identifying which of the CTI data fields are physical and which of the CTI fields are logical. The identification of the CTI data fields may be based on the telephony system topology and common information from various sources regarding the same session. The physical CTI data fields may be used for locating audio to be recorded and allocating recording channels and the logical CTI data fields may be used for telephone call tracking, monitoring, analytics purposes and many other uses.

As indicated at box 330, identifying one of the physical CTI data fields received from the first source and one of the logical CTI data fields received from the second source as being related to a specific telephone call. The method may include identifying, integrating and correlating the CTI data fields received from the plurality of the sources in order to create a complete identification of a certain telephone call. The integrating procedure may interface all sources of the system, for example, all CTI sources, may separate logical information from physical information and may generate a complete identification of each session, e.g., a complete logical information description and a complete physical information description.

As indicated at box 340, the method may include recording the telephone call based on audio location information from the physical CTI data field associated with the call. The location information from the physical CTI data field may include a single media source to be recorded.

According to some embodiments of the present invention the features of the method which are described at boxes 310, 320, 330 and 340 may be implemented at a single physical unit and according to other embodiments may be implemented at separate physical units. Other operations or sets of operations may be used in accordance with embodiments of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for recording telephone calls comprising:
   receiving computer telephony integration (CTI) data fields from first and second sources;
   identifying which of the CTI data fields are physical CTI data fields to be used for physically locating audio to be recorded;
   identifying which of the CTI data fields are logical CTI data fields to be used for telephone call tracking, wherein the logical CTI data fields comprise non-physical information related to the telephone call;
   identifying one of the physical CTI data fields received from the first source and one of the logical CTI data fields received from the second source as being related to a specific telephone call; and
   recording said specific telephone call based on audio location information from the physical CTI data field associated with the call.

2. The method of claim 1, wherein the first source is a gate, a switch or a private branch exchange.

3. The method of claim 1, wherein the second source is an automatic call distributor, a predictive dialer or a CTI server.

4. The method of claim 1, wherein the logical CTI data fields comprise at least one of: a telephone dialed number, a telephone number of a caller, a telephone control information and an agent identification information.

5. The method of claim 1, wherein the physical CTI data fields comprise at least one of: an extension number of a telephone extension participating in the telephone call, an IP address of a telephone device, a media access control address of a telephone device, a time-division multiplexing trunk information of the telephone call and a CTI call identifier of the telephone call.

6. The method of claim 1 further comprising:
   monitoring the telephone call in real-time based on audio location information from the logical CTI data fields associated with the call.

7. A system for recording telephone calls comprising:
   an integrator to receive CTI data fields from a first CTI driver and a second CTI driver, identify which of the CFI data fields are physical CTI data fields to be used for physically locating audio to be recorded and which of the CTI data fields are logical CTI data fields to be used for telephone call tracking, wherein the logical CTI data fields comprise non-physical information related to the telephone call, wherein the integrator is to identify one of the physical CTI data fields received from the first CTI driver and one of the logical CTI data fields received from the second CTI driver as being related to a specific telephone call; and
   an information manager to record the specific telephone call based on audio location information from the physical CTI data field associated with the call.

8. The system of claim 7, wherein the first CTI driver is a gate driver, a switch driver or a private branch exchange driver.

9. The system of claim 7, wherein the second CTI driver is an automatic call distributor driver, a predictive dialer driver or a CTI driver.

10. The system of claim 7, wherein the logical CTI data fields comprise at least one of: a telephone dialed number, a telephone number of a caller, a telephone control information and agent identification information.

11. The system of claim 7, wherein the physical CTI data fields comprise at least one of: an extension number of a telephone extension participating in the telephone call, an IP address of a telephone device, a media access control address of a telephone device, a time-division multiplexing trunk information of the telephone call and a CTI call identifier of the telephone call.

12. The system of claim 7, wherein the information manager is to monitor the telephone call in real-time based on audio location information from the logical CTI data fields associated with the call.

* * * * *